United States Patent
Oie

(10) Patent No.: US 12,132,240 B2
(45) Date of Patent: Oct. 29, 2024

(54) ELECTROLYTE SHEET FOR SOLID OXIDE FUEL CELL, METHOD FOR MANUFACTURING ELECTROLYTE SHEET FOR SOLID OXIDE FUEL CELL, AND UNIT CELL FOR SOLID OXIDE FUEL CELL

(71) Applicant: Murata Manufacturing Co., Ltd., Nagaokakyo (JP)

(72) Inventor: Hirofumi Oie, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 513 days.

(21) Appl. No.: 17/575,877

(22) Filed: Jan. 14, 2022

(65) Prior Publication Data
US 2022/0140374 A1    May 5, 2022

Related U.S. Application Data

(63) Continuation of application No. PCT/JP2020/028992, filed on Jul. 29, 2020.

(30) Foreign Application Priority Data

Jul. 29, 2019  (JP) .................... 2019-138877

(51) Int. Cl.
*H01M 8/1246*  (2016.01)
*H01M 8/124*  (2016.01)
*H01M 8/12*  (2016.01)

(52) U.S. Cl.
CPC .. *H01M 8/1246* (2013.01); *H01M 2008/1293* (2013.01); *H01M 2300/0074* (2013.01)

(58) Field of Classification Search
None
See application file for complete search history.

(56) References Cited

U.S. PATENT DOCUMENTS

2007/0238007 A1   10/2007  Katagiri et al.
2009/0047562 A1   2/2009   Hata et al.

FOREIGN PATENT DOCUMENTS

| | | |
|---|---|---|
| JP | H0689736 A | 3/1994 |
| JP | H09320616 A | 12/1997 |
| JP | 2006004678 A | 1/2006 |
| JP | 2006024371 A | 1/2006 |
| JP | 2007273144 A | 10/2007 |
| JP | 2013149506 A | 8/2013 |
| JP | 2014071935 A | 4/2014 |
| WO | 2007013567 A1 | 2/2007 |

OTHER PUBLICATIONS

International Search Report issued for PCT/JP2020/028992, date of mailing Oct. 20, 2020.

*Primary Examiner* — Tracy M Dove
(74) *Attorney, Agent, or Firm* — ArentFox Schiff LLP

(57) ABSTRACT

An electrolyte sheet for solid oxide fuel cells includes a ceramic plate body having rounded corners in a plan view from a thickness direction of the ceramic plate body, the ceramic plate body having a thickness of 200 μm or less, and each of the rounded corners having a ratio Dmax/Dmin of 1.0 to 1.1, wherein Dmax and Dmin respectively represent maximum and minimum values between distances D from an intersection of extension lines of two sides of the ceramic plate body adjacent to a respective corner to starting points of the respective extension lines in the plan view.

19 Claims, 5 Drawing Sheets

ELECTROLYTE SHEET FOR SOLID OXIDE FUEL CELL, METHOD FOR MANUFACTURING ELECTROLYTE SHEET FOR SOLID OXIDE FUEL CELL, AND UNIT CELL FOR SOLID OXIDE FUEL CELL

CROSS REFERENCE TO RELATED APPLICATIONS

The present application is a continuation of International application No. PCT/JP2020/028992, filed Jul. 29, 2020, which claims priority to Japanese Patent Application No. 2019-138877, filed Jul. 29, 2019, the entire contents of each of which are incorporated herein by reference.

FIELD OF THE INVENTION

The present invention relates to an electrolyte sheet for solid oxide fuel cells, a method of producing an electrolyte sheet for solid oxide fuel cells, and a unit cell for solid oxide fuel cells.

BACKGROUND OF THE INVENTION

A solid oxide fuel cell (SOFC) is a device that produces electric energy through reactions of $H_2+O^{2-} \rightarrow H_2O+2e^-$ at the fuel electrode and $(1/2)O_2+2e^- \rightarrow O^{2-}$ at the air electrode. An SOFC is typically a stack of unit cells each including an electrolyte sheet made of a zirconia-based ceramic plate body and a fuel electrode and an air electrode that are formed on the electrolyte sheet.

For example, Patent Literature 1 discloses a hexahedral solid oxide fuel cell stack whose corner portions each including a vertex and sides have been chamfered.
Patent Literature 1: JP 2013-149506 A

SUMMARY OF THE INVENTION

Chamfering the corners of an SOFC enables suppression of breakage and cracks due to thermal stress as described in Patent Literature 1.

Meanwhile, electrolyte sheets have been increased in size and reduced in thickness so as to increase power generation efficiency of SOFCs. Reducing the thickness of an electrolyte sheet made of a ceramic plate body, however, tends to cause defects such as a crack. In consideration of these issues, rounding the corners of an electrolyte sheet itself has been examined to ensure reliability during operation at high temperatures.

However, processing such as cutting or punching to round a corner of an electrolyte sheet, which is thin and thus sensitive to the cutting blades, may deform the processed surface of the sheet. Such deformation may cause waviness, burrs, and/or variations in surface roughness of the side surfaces of the electrolyte sheet, thereby decreasing the strength of the electrolyte sheet.

The corners of an unfired green sheet may also be rounded by processing with a tool such as an end mill or a die grinder instead of processing such as cutting or punching. However, an unfired green sheet, which is thin and soft, would be deformed by such processing, and thus would be difficult to process into a desired shape.

A yet another option is rounding the corners of a fired electrolyte sheet by processing with a tool such as an end mill or a die grinder. However, such a thin electrolyte sheet made of a ceramic plate body easily breaks, and thus would be difficult to process into a desired shape.

The present invention was made to solve the above problem, and aims to provide an electrolyte sheet for SOFCs which has high strength and excellent reliability during operations at high temperatures. The present invention also aims to provide a method of producing the electrolyte sheet and a unit cell for SOFCs which includes the electrolyte sheet.

The electrolyte sheet for SOFCs of the present invention has a thickness of 200 μm or less and has rounded corners in a plan view from a thickness direction of the electrolyte sheet.

In a first embodiment, each of the rounded corners has a ratio Dmax/Dmin of 1.0 to 1.1, wherein Dmax and Dmin respectively represent maximum and minimum values between distances D from an intersection of extension lines of two sides adjacent to the corner to starting points of the respective extension lines in the plan view.

In a second embodiment, each of the corners has a ratio Rmax/Rmin of 1.0 to 1.3, wherein Rmax and Rmin respectively represent maximum and minimum values between radii of curvature R determined at the corner in the plan view.

The method of producing an electrolyte sheet for SOFCs of the present invention includes: pressing together an unsintered plate body containing a ceramic material powder and a resin layer containing a resin powder to form an unsintered body; cutting corners of the unsintered body to round the corners of the unsintered body; and firing the unsintered body to burn off the resin layer and sinter the unsintered plate body into a ceramic plate body.

The unit cell for SOFCs of the present invention includes: a fuel electrode; an air electrode; and the electrolyte sheet of the present invention between the fuel electrode and the air electrode.

The present invention can provide an electrolyte sheet for SOFCs which has high strength and excellent reliability during operations at high temperatures.

DETAILED DESCRIPTION OF THE PREFERRED EMBODIMENTS

The electrolyte sheet for SOFCs of the present invention, the method of producing an electrolyte sheet for SOFCs of the present invention, and a unit cell for SOFCs of the present invention are described below.

The present invention is not limited to the following preferred embodiments, and may be suitably modified without departing from the gist of the present invention. Combinations of two or more preferred features described in the following preferred features are also within the scope of the present invention.

Hereinafter, the electrolyte sheets for SOFCs in the embodiments are each referred to simply as "the electrolyte sheet for SOFCs of the present invention" when no distinction is made between the embodiments.

The drawings are schematic drawings, and the dimensions, the aspect ratio, the scale, and other parameters may differ from those of the actual products.

Electrolyte Sheet for SOFCs

Figure 1:
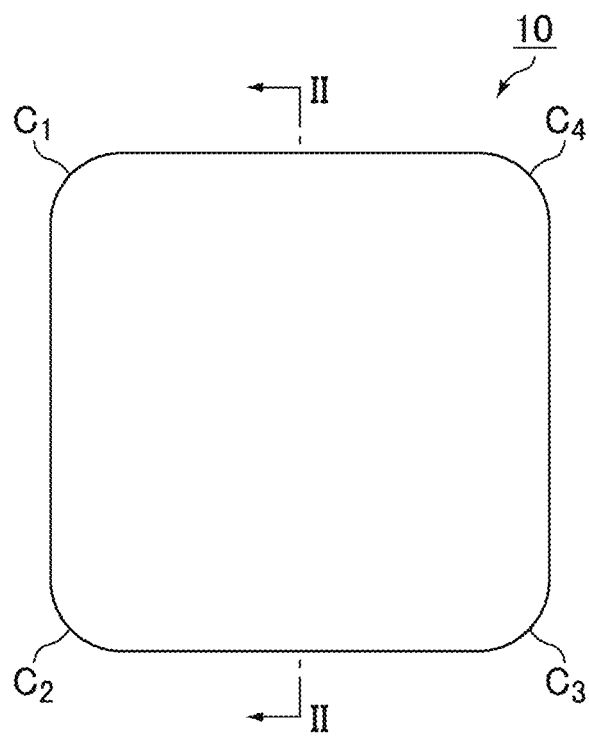
FIG. 1 is a schematic plan view of an example of the electrolyte sheet for SOFCs of the present invention.
Figure 2:
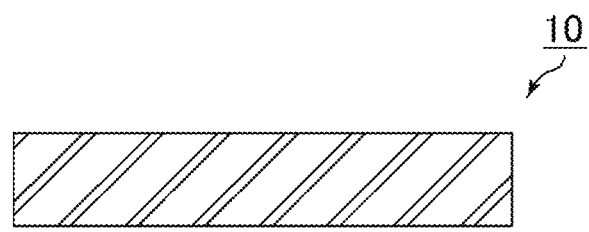
FIG. 2 is a cross-sectional view taken along line II-II of the electrolyte sheet in FIG. 1.

FIG. 1 is a schematic plan view of an example of the electrolyte sheet for SOFCs of the present invention. FIG. 2 is a cross-sectional view taken along line II-II of the electrolyte sheet in FIG. 1.

An electrolyte sheet 10 for SOFCs shown in FIG. 1 and FIG. 2 is made of a ceramic plate body. The ceramic plate body is, for example, a sintered body of a solid electrolyte such as scandia-stabilized zirconia or yttria-stabilized zirconia.

The planar shape of the electrolyte sheet 10 as viewed from a thickness direction (vertical direction in FIG. 2) is a substantially square shape whose corners $C_1$, $C_2$, $C_3$, and $C_4$ are rounded.

The electrolyte sheet for SOFCs of the present invention is preferably provided with at least one through hole penetrating therethrough in the thickness directions as a gas flow path. When the electrolyte sheet is provided with through hole(s), the number, shape(s), position(s), and the like of the through hole(s) are not limited.

The electrolyte sheet for SOFCs of the present invention has a thickness of 200 µm or less. The electrolyte sheet for SOFCs of the present invention preferably has a thickness of 30 µm or more, more preferably 50 µm or more.

The thickness of an electrolyte sheet means an average thickness calculated from values obtained by measuring the thickness at randomly selected nine sites within a region excluding the portions 5 mm inside the peripheral edges of the sheet with a U-shape Frame Sheet Metal Micrometer (available from Mitutoyo Corporation, PMU-MX).

The electrolyte sheet for SOFCs of the present invention has rounded corners in a plan view from a thickness direction of the electrolyte sheet. The planar shape of the electrolyte sheet as viewed from the thickness direction is preferably a substantially rectangular shape with rounded corners, more preferably a substantially square shape with rounded corners.

In the first embodiment of the present invention, each of the corners has a ratio Dmax/Dmin of 1.0 to 1.1, wherein Dmax and Dmin respectively represent maximum and minimum values between distances D from an intersection of extension lines of two sides adjacent to the corner to starting points of the respective extension lines in the plan view.

With a ratio Dmax/Dmin of 1.0 to 1.1, the corners can be rounded with a high positional accuracy. As a result, the electrolyte sheet can have higher strength and an SOFC with the electrolyte sheet can have better reliability during operations at high temperatures.

Each distance D between an intersection of extension lines of two sides adjacent to a corner and the starting point of the target extension line can be measured with Wide-Area 3D Measurement System (available from KEYENCE Corporation, VR-3100).

A method of calculating the ratio Dmax/Dmin for the electrolyte sheet 10 in FIG. 1 is described as an example below.

Figure 3:
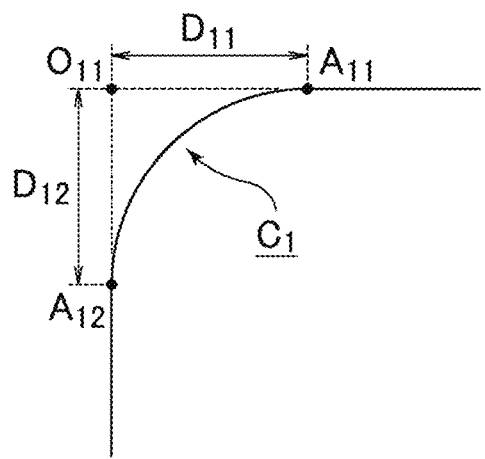
FIG. 3 is a plan view showing a method of measuring a distance $D_{11}$ and a distance $D_{12}$ at a corner $C_1$ of the electrolyte sheet in FIG. 1.

FIG. 3 is a plan view showing a method of measuring a distance $D_{11}$ and a distance $D_{12}$ at a corner $C_1$ of the electrolyte sheet in FIG. 1.

As shown in FIG. 3, a distance $D_{11}$ between an intersection $O_{11}$ of extension lines of two sides adjacent to the corner $C_1$ and a starting point $A_{11}$ of one of the extension lines, and a distance $D_{12}$ between the intersection $O_{11}$ and a starting point $A_{12}$ of the other of the extension lines are measured. The maximum value between the distance $D_{11}$ and the distance $D_{12}$ is taken as Dmax and the minimum value between them is taken as Dmin. The ratio Dmax/Dmin is thus calculated.

Similarly, the ratio Dmax/Dmin is calculated at a corner $C_2$, a corner $C_3$, and a corner $C_4$ as well. All the corners have a ratio Dmax/Dmin of 1.0 to 1.1.

When the electrolyte sheet has n corners, the ratio Dmax/Dmin is calculated at each of the n corners, and all the n corners have a ratio Dmax/Dmin of 1.0 to 1.1.

In the first embodiment of the present invention, preferably, each of the corners has a ratio Rmax/Rmin of 1.0 to 1.3, wherein Rmax and Rmin respectively represent maximum and minimum values between radii of curvature R determined at the corner in the plan view.

In the second embodiment of the present invention, each of the corners has a ratio Rmax/Rmin of 1.0 to 1.3, wherein Rmax and Rmin respectively represent maximum and minimum values between radii of curvature R determined at the corner in the plan view.

With a ratio Rmax/Rmin of 1.0 to 1.3, the corners can be rounded with a high positional accuracy. As a result, the electrolyte sheet can have higher strength and an SOFC with the electrolyte sheet can have better reliability during operations at high temperatures.

The radius of curvature R of a corner is determined at 40 points on the corner within a range of 60° at equal intervals with a video measuring system (available from Nikon Corporation, NEXIV VMZ-R6555).

The method of calculating the ratio Rmax/Rmin for the electrolyte sheet 10 in FIG. 1 is described as an example below.

Figure 4:
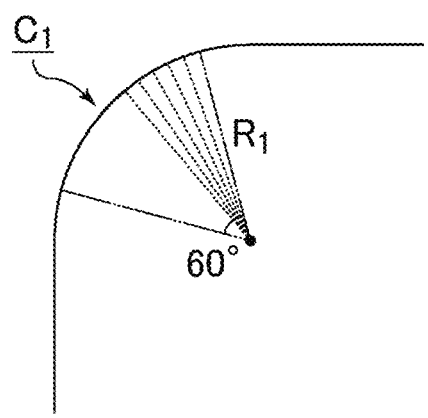
FIG. 4 is a plan view showing a method of determining a radius of curvature $R_1$ at the corner $C_1$ of the electrolyte sheet in FIG. 1.

FIG. 4 is a plan view showing a method of determining a radius of curvature $R_1$ at the corner $C_1$ of the electrolyte sheet in FIG. 1.

As shown in FIG. 4, the radius of curvature $R_1$ of the corner $C_1$ is calculated at 40 points on the corner $C_1$ at equal intervals within a range of 60°. The maximum value between the radii of curvature is taken as Rmax and the minimum value between the radii of curvature is taken as Rmin. The ratio Rmax/Rmin is thus calculated.

Similarly, the ratio Rmax/Rmin is calculated at the corner $C_2$, the corner $C_3$, and the corner $C_4$ as well. All the corners have a ratio Rmax/Rmin of 1.0 to 1.3.

When the electrolyte sheet has n corners, the ratio Rmax/Rmin is calculated at each of the n corners, and all the n corners have a ratio Rmax/Rmin of 1.0 to 1.3.

The ratio Rmax/Rmin is preferably 1.0 to 1.2, more preferably 1.0 to 1.1.

In the electrolyte sheet for SOFCs of the present invention, all of the corners may have the same radius of curvature or one or more or all of the corners may have different radii of curvature.

In the electrolyte sheet for SOFCs of the present invention, preferably, the side surface of a corner has an arithmetic average roughness Sa of 0.2 μm or less. With the flattened side surface of a corner, the electrolyte sheet can have higher strength and an SOFC with the electrolyte sheet can have better reliability during operations at high temperatures.

The arithmetic average roughness Sa of the side surface of a corner is measured by dividing an electrolyte sheet into samples having a size with which each sample can be placed in a three-dimensional scanning electron microscope (3D-SEM) (available from Elionix Inc., ERA-8900FE), preprocessing the samples by coating the portions of the samples corresponding to the corners of electrolyte sheets with Pt, and then measuring the roughness with an acceleration voltage of 5 kV, a working distance (WD) of 15 μm, and an observation magnification of 3000×.

In the electrolyte sheet for SOFCs of the present invention, the side surface of a corner has an arithmetic average roughness Sa of more preferably 0.15 μm or less, still more preferably 0.1 μm or less. The side surface of a corner also preferably has an arithmetic average roughness Sa of 0.01 μm or more.

In the electrolyte sheet for SOFCs of the present invention, preferably, the side surfaces of all the corners have an arithmetic average roughness Sa falling within the range above.

In the electrolyte sheet for SOFCs of the present invention, preferably, a corner has a burr height of 30 μm or less. With a corner having a burr height of 30 μm or less, the electrolyte sheet can have higher strength and an SOFC with the electrolyte sheet can have better reliability during operations at high temperatures.

The burr height of a corner means the height measured by scanning a 4-mm region on the corner with a contact measuring device (available from Mitutoyo Corporation, SJ-400) at a rate of 0.5 mm/sec, flattening the corner surface, and measuring the height of the corner within a region from the peripheral edge of the sheet to the positions 3 mm inside the edge. The stylus used is one with a 60° tip angle.

In the electrolyte sheet for SOFCs of the present invention, a corner has a burr height of more preferably 20 μm or less, more preferably 15 μm or less.

In the electrolyte sheet for SOFCs of the present invention, preferably, all the corners have a burr height falling within the range above.

The electrolyte sheet for SOFCs of the present invention is preferably produced by the following method.

Method of Producing Electrolyte Sheet for SOFCs

The method of producing an electrolyte sheet for SOFCs of the present invention includes: producing an unsintered body; cutting corners of the unsintered body; and firing the unsintered body. Preferably, the method of producing an electrolyte sheet for SOFCs of the present invention further includes forming a through hole in the unsintered body.

These steps are described below.

Producing Unsintered Body

First, an unsintered body is produced by pressing together an unsintered plate body containing a ceramic material powder and a resin layer containing a resin powder.

The unsintered plate body consists of a single ceramic green sheet or a plurality of ceramic green sheets.

A ceramic green sheet is suitably produced by tape casting, particularly doctor blading or calendaring.

Figure 5A:
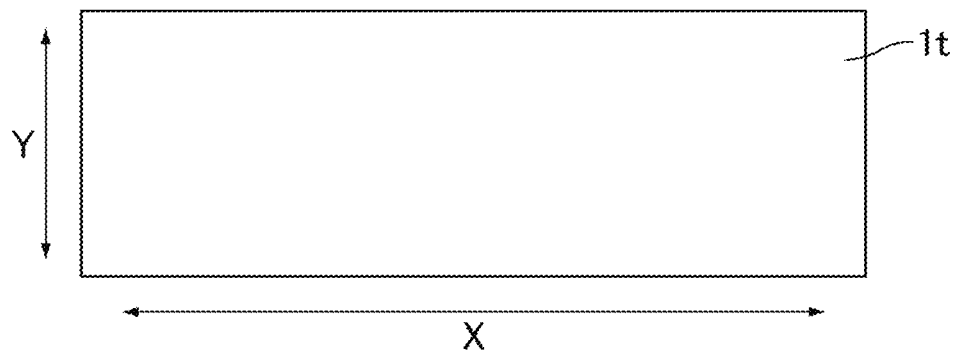
FIG. 5A, FIG. 5B, and FIG. 5C are schematic plan views showing an example of producing ceramic green sheets.
Figure 5B:
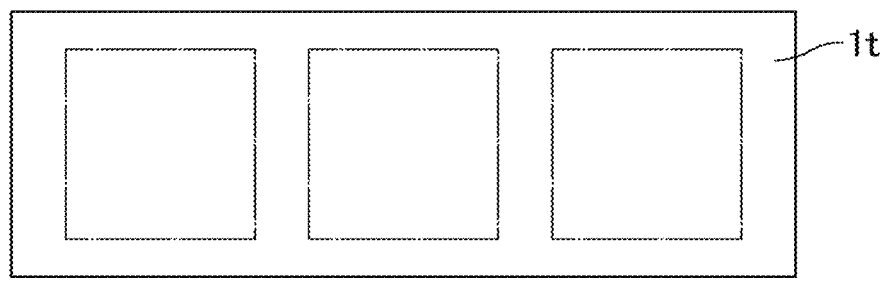
Figure 5C:
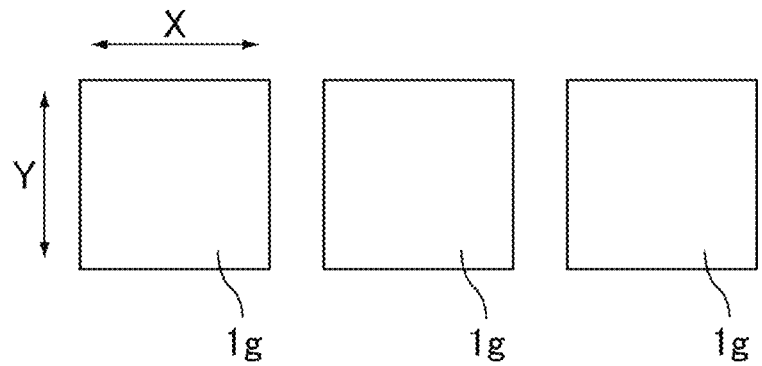

FIG. 5A, FIG. 5B, and FIG. 5C are schematic plan views of an example of producing ceramic green sheets.

As shown in FIG. 5A, a carrier film is coated with a ceramic slurry obtained by mixing a ceramic material powder, a binder, an organic solvent and, as necessary, additive(s) such as a dispersant, so that ceramic green tape 1$t$ is obtained. In FIG. 5A, X indicates the casting directions and Y indicates the directions perpendicular to the casting directions. The ceramic material powder is typically a solid electrolyte powder such as scandia-stabilized zirconia powder or yttria-stabilized zirconia powder.

The resulting ceramic green tape 1$t$ is punched to obtain pieces having a predetermined size by a known technique as shown in FIG. 5B. The pieces are removed from the carrier film and ceramic green sheets 1$g$ are produced as shown in FIG. 5C. Punching of the ceramic green tape and removal of the punched-out pieces from the carrier film may be performed in any order.

Figure 6:
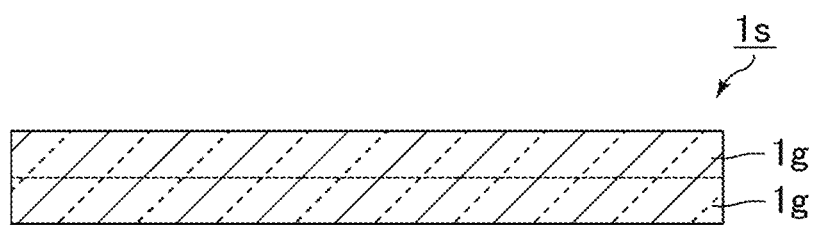
FIG. 6 is a schematic cross-sectional view of an example of producing an unsintered plate body.

FIG. 6 is a schematic cross-sectional view of an example of producing an unsintered plate body.

Although FIG. 6 shows producing an unsintered plate body 1$s$ by stacking two ceramic green sheets 1$g$ and compression-bonding these sheets, any number of ceramic green sheets 1$g$ may be used. The ceramic green sheets 1$g$ may not be compression-bonded, and may simply be stacked on one another. When the unsintered plate body 1$s$ includes a plurality of ceramic green sheets 1$g$, the thickness of the ceramic plate body 1$s$ controlled as appropriate in a simple manner. The unsintered plate body 1$s$ may consist of a single ceramic green sheet 1$g$. In this case, the step shown in FIG. 6 is omitted.

The unsintered body 1$s$ produced by, for example, pressing together an unsintered plate body and a resin layer on at least a first main surface of the unsintered plate body.

Figure 7:
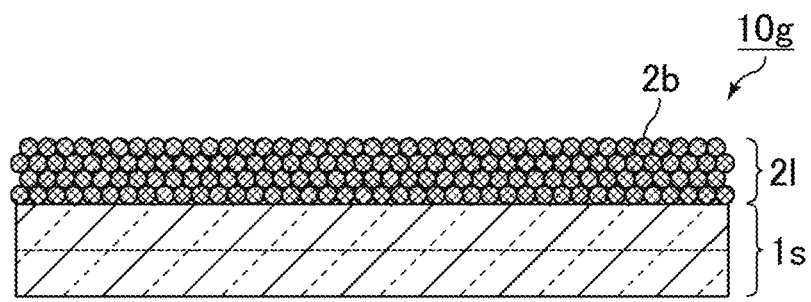
FIG. 7 is a schematic cross-sectional view of an example of producing an unsintered body by pressing together an unsintered plate body and a resin layer formed on a first main surface of the unsintered plate body.

FIG. 7 is a schematic cross-sectional view of an example of producing an unsintered body by pressing together an unsintered plate body and a resin layer formed on a first main surface of the unsintered plate body.

As shown in FIG. 7, a first main surface of the unsintered plate body 1$s$ is coated with a resin slurry containing a resin powder 2$b$, and thus a resin layer 21 is formed on the first main surface of the unsintered plate body is. The unsintered plate body 1$s$ and the resin layer 21 are then pressed together, whereby an unsintered body 10$g$ is produced.

Although FIG. 7 shows formation of the resin layer 21 only on the first main surface of the unsintered plate body is, one resin layer 21 may be formed on the first main surface of the unsintered plate body 1$s$ and another resin layer 21 may be formed on a second main surface of the unsintered plate body 1$s$.

Figure 8:
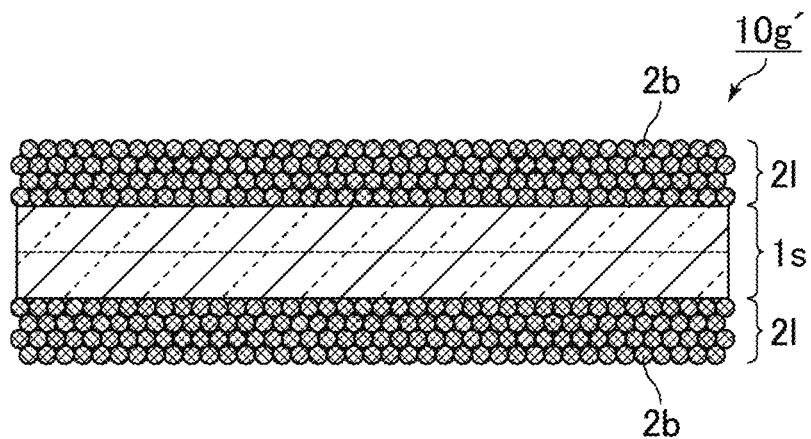
FIG. 8 is a schematic cross-sectional view of another example of producing an unsintered body which is different from the example in FIG. 7.

FIG. 8 is a schematic cross-sectional view of another example of producing an unsintered body which is different from the example in FIG. 7.

As shown in FIG. 8, the resin layers 21 are formed on the first and second main surfaces of the unsintered plate body 1$s$ by coating the first and second main surfaces of the unsintered plate body 1$s$ with a resin slurry containing the resin powder 2b. The unsintered plate body 1s and the resin layers 21 are then pressed together, whereby an unsintered body 10g' is produced.

The following steps are described mainly using the unsintered body 10g shown in FIG. 7.

The resin slurry is formed by mixing the resin powder 2b, a binder, an organic solvent and, as necessary, additives such as a dispersant. The resin powder 2b is preferably made of a resin material that is poorly soluble in an organic solvent used in production of a resin slurry. The resin powder 2b has a spherical shape with a median size of 0.5 µm to 10 µm, for example.

The median size is defined as the particle size at 50% ($D_{50}$) in a cumulative particle size distribution curve of the resin powder 2b expressed as cumulative percentage against particle size scale. The particle size distribution of the resin powder 2b is measured with, for example, a laser diffraction particle size distribution measuring device. The median size used here is the equivalent spherical diameter because the resin powder 2b may have a shape distorted through the production processes.

The expression "poorly soluble in an organic solvent" herein means that when 100 g of an organic solvent and 0.1 g of a resin powder are mixed at room temperature (25° C.) for 24 hours, there remains a visually observable residue. The organic solvent used to prepare a resin slurry is, for example, at least one solvent (alone or in a mixture) selected from toluene, ethanol, isopropanol, butyl acetate, ethyl acetate, terpineol, and water. In this case, the resin powder 2b is made of a crosslinked acrylic resin, for example.

Forming Unsintered Body Through Hole

Although not shown, the unsintered body 10g may be provided with an unsintered body through hole penetrating the unsintered body in a stacking direction.

An unsintered body through hole is preferably formed by drilling. In this case, the unsintered body 10g is drilled from its first main surface to second main surface or vice versa such that an unsintered body through hole penetrating the unsintered body 10g in the stacking direction is formed. The drilling may be performed under any conditions.

Cutting Corners of Unsintered Body

Figure 9A:
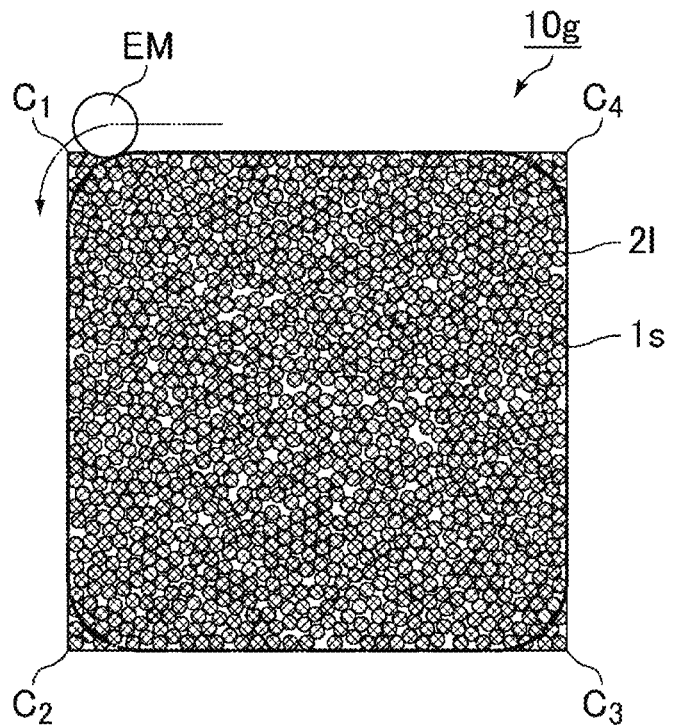
FIG. 9A and FIG. 9B are schematic plan views of an example of cutting the corners of an unsintered body.
Figure 9B:
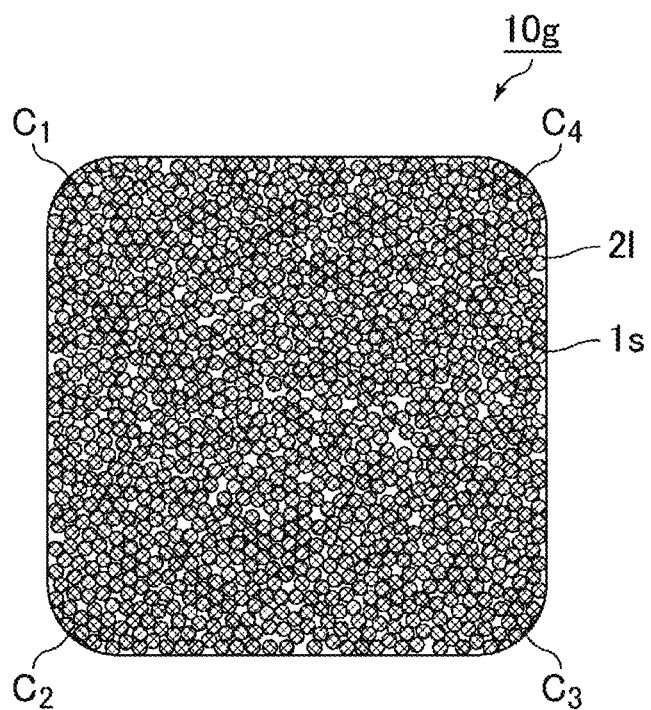

FIG. 9A and FIG. 9B are schematic plan views of an example of cutting the corners of an unsintered body.

FIG. 9A and FIG. 9B show cutting the corners $C_1$, $C_2$, $C_3$, and $C_4$ of the unsintered body 10g to round the corners $C_1$, $C_2$, $C_3$, and $C_4$ of the unsintered body 10g.

Preferably, the corners $C_1$, $C_2$, $C_3$, and $C_4$ of the unsintered body 10g are cut with an end mill EM. The end milling may be performed under any conditions.

The unsintered body 10g has a larger thickness and higher rigidity than a single unsintered plate body 1s, and thus the unsintered plate body 1s is less or not deformed when the corners are cut. This enables production of an electrolyte sheet with corners that are positioned with high accuracy and have flat side surfaces. Thus, the electrolyte sheet can have higher strength and an SOFC with the electrolyte sheet can have better reliability during operations at high temperatures.

The forming an unsintered body through hole and the cutting the corners of an unsintered body may be performed in any order.

Firing Unsintered Body

Figure 10:
FIG. 10 is a schematic cross-sectional view of an example of firing an unsintered body.

FIG. 10 is a schematic cross-sectional view of an example of firing an unsintered body.

When the unsintered body 10g is fired, the resin layer 21 is burned off. Also, the unsintered plate body 1s is sintered into a ceramic plate body 10p.

When the resin layer 21 is burned off, a first main surface of the ceramic plate body 10p becomes rough with scattered recesses. Meanwhile, when the unsintered body 10g' shown in FIG. 8 is fired, the resin layers 21 formed on the respective first and second main surfaces of the unsintered plate body 1s are burned off, so that both the first main surface and the second main surface of the resulting ceramic plate body become rough with scattered recesses.

Preferably, the firing an unsintered body includes degreasing and sintering.

Unit Cell for SOFCs

Figure 11:
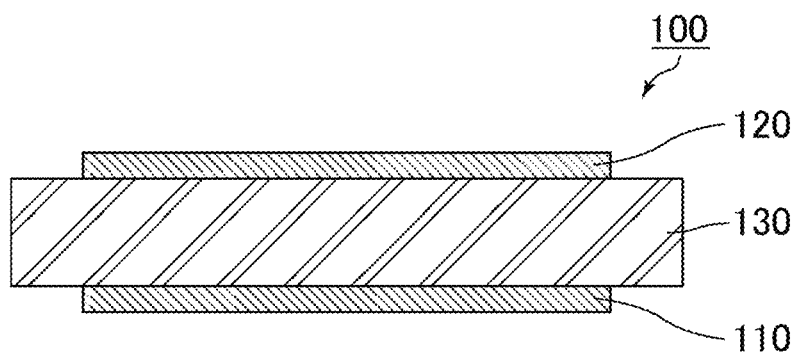
FIG. 11 is a schematic cross-sectional view of an example of a unit cell for SOFCs of the present invention.

FIG. 11 is a schematic cross-sectional view of an example of a unit cell for SOFCs of the present invention.

A unit cell 100 for SOFCs shown in FIG. 11 includes a fuel electrode 110, an air electrode 120, and an electrolyte sheet 130 between the fuel electrode 110 and the air electrode 120. The electrolyte sheet 130 is the electrolyte sheet for SOFCs of the present invention. The fuel electrode 110 and the air electrode 120 may be a known fuel electrode for SOFCs and a known air electrode for SOFCs, respectively.

The unit cell for SOFCs of the present invention includes the electrolyte sheet for SOFCs of the present invention. Since the electrolyte sheet for SOFCs of the present invention has high strength, SOFCs having high reliability during operations at high temperatures can be produced.

The unit cell for SOFCs of the present invention can be produced by forming a fuel electrode on one of a first main surface and a second main surface of the electrolyte sheet for SOFCs of the present invention and forming an air electrode on the other of the first main surface and the second main surface of the electrolyte sheet.

First, powder of the material of a fuel electrode or an air electrode is mixed with a binder, a solvent and, as necessary, additive(s) such as a dispersant to prepare a slurry. A first main surface or a second main surface of an electrolyte sheet is coated with the slurry to a predetermined thickness, followed by drying the coating film. Thus, a green layer for a fuel electrode or an air electrode is formed. The green layer is fired to produce a fuel electrode or an air electrode. The firing conditions such as the firing temperature may be determined as appropriate depending on the material and the like of the fuel electrode or the air electrode.

The fuel electrode and the air electrode may be produced using a material of known fuel electrodes for SOFCs and a material of known air electrodes for SOFCs, respectively. The binder, solvent, and other additives used to produce a slurry for a fuel electrode or an air electrode may be of any type, and may respectively be selected as appropriate from known binders, solvents, and other additives used to produce a fuel electrode for SOFCs or an air electrode for SOFCs.

EXAMPLES

Examples that more specifically disclose the electrolyte sheet for SOFCs of the present invention are described below. The present invention is not limited to these examples.

Examples 1 to 4

Producing Unsintered Body

Scandia-stabilized zirconia powder, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a ceramic slurry.

The ceramic slurry was formed into a sheet on a carrier film made of polyethylene terephthalate by a known technique to give a ceramic green tape as shown in FIG. 5A. The ceramic green tape was punched by a known technique into 130-mm squares as shown in FIG. 5B and removed from the carrier film. Thus, ceramic green sheets as shown in FIG. 5C were produced.

Two ceramic green sheets removed from the carrier film were stacked and compression-bonded to form an unsintered plate body as shown in FIG. 6.

A spherical resin powder made of a crosslinked acrylic resin and having a median size of 1 μm, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a resin slurry.

The resin slurry was applied by printing to a first main surface of the unsintered plate body and then dried to form a resin layer on the first main surface of the unsintered plate body as shown in FIG. 7.

The unsintered plate body and the resin layer formed on the first main surface of the unsintered plate body were pressed together, so that an unsintered body as shown in FIG. 7 was produced. The unsintered body was produced at a heating temperature of 60° C. and a pressing force of 1500 kgf/cm². The unsintered body had a thickness of 160 μm.

Cutting Corners of Unsintered Body

As shown in FIG. 9A and FIG. 9B, the corners of the unsintered body were rounded by cutting with an end mill. The end milling was performed at a feed rate of 0.03 mm/revolution and a spindle speed of 3000 revolutions/minute.

Firing Unsintered Body

The unsintered body obtained through the steps above was fired in a furnace into a ceramic plate body as shown in FIG. 10.

The firing the unsintered body includes degreasing and sintering. The degreasing was performed by holding the unsintered body at 400° C. for a predetermined time. The sintering was performed by holding the degreased unsintered body at 1400° C. for five hours.

Thus, electrolyte sheets of Examples 1 to 4 were produced.

Example 5

An electrolyte sheet was produced by the same procedure as in Examples 1 to 4, except that the end mill spindle speed was changed to 5000 revolutions/minute.

Example 6

An electrolyte sheet was produced by the same procedure as in Examples 1 to 4, except that the end mill spindle speed was changed to 1000 revolutions/minute.

The ratio Dmax/Dmin, the ratio Rmax/Rmin, the arithmetic average roughness Sa of the side surface of each corner, and the burr height of each corner were measured on each of the electrolyte sheets of Examples 1 to 6 by the methods described above. Table 1 shows the results. For the values of the corners, the largest value of the results of the four corners is shown.

The electrolyte sheets of Examples 1 to 6 were subjected to a four-point bending test using a precision universal tester (available from Shimadzu Corporation, AGS-X). The target electrolyte sheet was placed on the lower jigs such that the lower jigs were 32.5 mm apart from each other relative to the center of the electrolyte sheet. The upper jigs placed 65 mm apart from each other were lowered from above onto the electrolyte sheet at a rate of 5 mm/min to measure the strength of the electrolyte sheet. An electrolyte sheet was evaluated as excellent when its strength was 200 MPa or more, evaluated as good when its strength was 160 MPa or more and less than 200 MPa, and evaluated as poor when its strength was less than 160 MPa. Table 1 shows the results.

The electrolyte sheets of Examples 1 to 6 were subjected to a thermal shock test by the following method. One hundred target electrolyte sheets were stacked, heated to 900° C. at a rate of 10° C./min, held at 900° C. for one hour, and then cooled to 300° C. at a rate of 10° C./min. With these operations considered as one cycle of operations, the electrolyte sheets were subjected to 100 cycles of operations. Then, whether or not the electrolyte sheets after the 100 cycles broke was visually determined. Electrolyte sheets were evaluated as good when they did not break and evaluated as poor when they broke. Table 1 shows the results.

TABLE 1

| | Thickness of unsintered body (μm) | End mill feed rate (mm/rev) | End mill spindle speed (rev/min) | Dmax/Dmin | Rmax/Rmin | Corner side surface Sa (μm) | Corner burr height (μm) | Strength | Thermal shock test |
|---|---|---|---|---|---|---|---|---|---|
| Example 1 | 160 | 0.03 | 3000 | 1.00 | 1.00 | 0.01 | 10 | Excellent | Good |
| Example 2 | 160 | 0.03 | 3000 | 1.10 | 1.03 | 0.1 | 15 | Excellent | Good |
| Example 3 | 160 | 0.03 | 3000 | 1.05 | 1.07 | 0.2 | 30 | Excellent | Good |
| Example 4 | 160 | 0.03 | 3000 | 1.00 | 1.10 | 0.1 | 4 | Excellent | Good |
| Example 5 | 160 | 0.03 | 5000 | 1.05 | 1.03 | 0.1 | 45 | Good | Good |
| Example 6 | 160 | 0.03 | 1000 | 1.05 | 1.07 | 0.4 | 15 | Good | Good |

Table 1 shows that in Examples 1 to 6 in which the ratio Dmax/Dmin is 1.0 to 1.1 or the ratio Rmax/Rmin is 1.0 to 1.3, the electrolyte sheets have high strength and thus have excellent thermal shock resistance.

In particular, in Examples 1 to 4 in which the arithmetic average roughness Sa of the side surfaces of the corners is 0.2 μm or less or the burr height of the corners is 30 μm or less, the electrolyte sheets have even higher strength.

REFERENCE SIGNS LIST 1g ceramic green sheet
1s unsintered plate body
1t ceramic green tape
2b resin powder
21 resin layer
10 electrolyte sheet for SOFCs 10g, 10g' unsintered body
10p ceramic plate body
100 unit cell for SOFCs
110 fuel electrode
120 air electrode
130 electrolyte sheet
$A_{11}$, $A_{12}$ starting points of extension lines of two sides adjacent to corner $C_1$
$C_1$, $C_2$, $C_3$, $C_4$ corner
$D_{11}$, $D_{12}$ distances between intersection of extension lines of two sides adjacent to corner $C_1$ and respective starting points of extension lines
EM end mill
$O_{11}$ intersection of extension lines of two sides adjacent to corner $C_1$
$R_1$ radius of curvature of corner $C_1$

The invention claimed is:

1. An electrolyte sheet for solid oxide fuel cells, the electrolyte sheet comprising:
a ceramic plate body having rounded corners in a plan view from a thickness direction of the ceramic plate body,
the ceramic plate body having a thickness of 200 μm or less, and
each of the rounded corners having a ratio Dmax/Dmin of 1.0 to 1.1, wherein Dmax and Dmin respectively represent maximum and minimum values between distances D from an intersection of extension lines of two sides of the ceramic plate body adjacent to a respective corner to starting points of the respective extension lines in the plan view.

2. The electrolyte sheet according to claim 1, wherein a side surface of at least one of the rounded corners has an arithmetic average roughness Sa of 0.2 μm or less.

3. The electrolyte sheet according to claim 2, wherein the arithmetic average roughness Sa is 0.01 μm to 0.2 μm.

4. The electrolyte sheet according to claim 1, wherein at least one of the corners has a burr height of 30 μm or less.

5. The electrolyte sheet according to claim 1, wherein each of the rounded corners has a ratio Rmax/Rmin of 1.0 to 1.3, wherein Rmax and Rmin respectively represent maximum and minimum values between radii of curvature R determined at the respective corner in the plan view.

6. The electrolyte sheet according to claim 1, wherein each of the rounded corners has a ratio Rmax/Rmin of 1.0 to 1.2, wherein Rmax and Rmin respectively represent maximum and minimum values between radii of curvature R determined at the respective corner in the plan view.

7. The electrolyte sheet according to claim 1, wherein each of the rounded corners has a ratio Rmax/Rmin of 1.0 to 1.1, wherein Rmax and Rmin respectively represent maximum and minimum values between radii of curvature R determined at the respective corner in the plan view.

8. A unit cell for solid oxide fuel cells, the unit cell comprising:
a fuel electrode;
an air electrode; and
the electrolyte sheet according to claim 1 between the fuel electrode and the air electrode.

9. An electrolyte sheet for solid oxide fuel cells, the electrolyte sheet comprising:
a ceramic plate body having rounded corners in a plan view from a thickness direction of the ceramic plate body,
the ceramic plate body having a thickness of 200 μm or less, and
each of the rounded corners having a ratio Rmax/Rmin of 1.0 to 1.3, wherein Rmax and Rmin respectively represent maximum and minimum values between radii of curvature R determined at a respective corner in the plan view.

10. The electrolyte sheet according to claim 9, wherein a side surface of at least one of the rounded corners has an arithmetic average roughness Sa of 0.2 μm or less.

11. The electrolyte sheet according to claim 10, wherein the arithmetic average roughness Sa is 0.01 μm to 0.2 μm.

12. The electrolyte sheet according to claim 9, wherein at least one of the corners has a burr height of 30 μm or less.

13. The electrolyte sheet according to claim 9, wherein the ratio Rmax/Rmin is 1.0 to 1.2.

14. The electrolyte sheet according to claim 9, wherein the ratio Rmax/Rmin is 1.0 to 1.1.

15. A unit cell for solid oxide fuel cells, the unit cell comprising:
a fuel electrode;
an air electrode; and
the electrolyte sheet according to claim 9 between the fuel electrode and the air electrode.

16. A method of producing an electrolyte sheet for solid oxide fuel cells, the method comprising:
pressing together an unsintered plate body containing a ceramic material powder and a resin layer containing a resin powder to form an unsintered body;
cutting corners of the unsintered body to round the corners of the unsintered body; and
firing the unsintered body to burn off the resin layer and sinter the unsintered plate body into a ceramic plate body; and,
wherein the corners of the unsintered body are cut such that each of the corners have a ratio Dmax/Dmin of 1.0 to 1.1, wherein Dmax and Dmin respectively represent maximum and minimum values between distances D from an intersection of extension lines of two sides of the unsintered body adjacent to a respective corner to starting points of the respective extension lines in a plan view from a thickness direction of the unsintered body.

17. The method of producing an electrolyte sheet according to claim 16, wherein the corners of the unsintered body are cut with an end mill.

18. The method of producing an electrolyte sheet according to claim 16, wherein the corners of the unsintered body are cut such that each of the corners have a ratio Rmax/Rmin of 1.0 to 1.3, wherein Rmax and Rmin respectively represent maximum and minimum values between radii of curvature R determined at a respective corner in a plan view from a thickness direction of the unsintered body.

19. The method of producing an electrolyte sheet according to claim 16, the method further comprising:
forming the resin layer on the unsintered plate body by coating at least one main surface of the unsintered plate body with a resin slurry containing the resin powder, and
pressing together the unsintered plate body and the resin layer formed on the at least one main surface.

* * * * *